June 23, 1964  W. H. COULTER  3,138,290
AUTOMATIC DILUTING APPARATUS
Filed Aug. 31, 1962  2 Sheets-Sheet 2

INVENTOR.
Wallace H. Coulter
BY
ATTYS.

United States Patent Office 3,138,290
Patented June 23, 1964

3,138,290
AUTOMATIC DILUTING APPARATUS
Wallace H. Coulter, Miami Springs, Fla., assignor to Coulter Electronics, Inc., Hialeah, Fla., a corporation of Illinois
Filed Aug. 31, 1962, Ser. No. 220,616
11 Claims. (Cl. 222—26)

This invention relates generally to apparatus for preparing diluted solutions, and more particularly, is concerned with improvements in apparatus of the character described which engenders important advantages in the automatic and positive control of the respective quantities of the substances to be used in preparing a solution of any desired concentration within a wide range of concentrations within which the apparatus is capable of operating.

This is an improvement of the invention disclosed in co-pending application for patent, Serial No. 69,890, filed November 17, 1960 by Wallace H. Coulter, Joseph Richard Coulter, Jr., and William Anthony Claps for the invention entitled "Automatic Diluting Apparatus."

In said co-pending application, there is described and claimed an automatic diluting apparatus for preparing sample solutions of desired concentration such as are intended for measurement, analysis or testing by means of fluid analyzing and testing equipment in many scientific and industrial fields, such as food chemistry, metallurgy, biological sciences, petroleum chemistry and numerous others. Understandably, the speed which the testing and analysis determinations are capable of being made and the degree of accuracy of such determinations depend in substantial measure upon the speed and accuracy with which the fluid sample to be tested can be prepared. To achieve desirable advantages and objectives, said diluting apparatus included a metering valve arrangement comprising a cylindrical vessel connected at each of its opposite ends to a multiple position valve having a discharge nozzle, said vessel having a piston plug freely movable along the axis of the vessel. The vessel was connected to a source of diluent fluid under pressure and calibrated so that upon axial movement of the piston plug from end to end of the vessel in either direction, a predetermined fixed or metered volume of said diluent fluid was swept out of the vessel ahead of the path of movement of the piston plug. The system was constructed automatically to fill the vessel with said fluid behind the plug so that the system always was filled with fluid or cocked ready to be used repeatedly to prepare sample solutions the volume of which always was the same as the volume of fluid swept out of said cylindrical vessel by the piston plug during each traversal of the vessel. Only, the concentrations of said fixed sample volumes of fluid were varied as desired by the apparatus.

To realize desired concentrations of said fixed volume of solution over a wide range of concentrations, said diluting apparatus employed novel means for introducing a volumetric variable into the system. Generally, said means comprised syringe-like devices which could be operated selectively to draw into the apparatus a predetermined quantity of fluid concentrate which would thereafter enable a sample solution of said fixed or metered volume having said predetermined quantity of said concentrate therein to be delivered through said discharge nozzle. As explained in said co-pending application, the desired concentration of the sample solution delivered by the automatic diluting apparatus was directly related to the quantity of said volumetric variable introduced into the system by means of said syringe-like devices.

The diluting apparatus embodying the herein invention operates upon the same general principles in that the herein apparatus also includes a metering valve arrangement for delivering a predetermined fixed or metered volume of sample solution during each cycle of operation of the apparatus and means for introducing said volumetric variable into the system. However, the automatic diluting apparatus of the herein invention utilizes novel and improved means for introducing said volumetric variable into the system. In all other respects, the general operation of the apparatus including the metering valve arrangement employed is substantially the same, in general principles, as that of the apparatus of said co-pending application. In other words, the herein invention contributes marked advantages over the syringe-like devices and employed in the apparatus of said co-pending application.

The syringe-like devices of said co-pending application were limited in some respects in the speed of operation permitted thereby in view of the fact that each of the syringe devices was required to be manipulated independently. In other words, where it was desired or necessary to use both of said devices, each of the plungers thereof had to be moved independently. A capillary vessel or tube was provided for each of the said devices and where it was desired to prepare fluid sample concentrations not capable of being made using the pair of devices shown in said co-pending application, another suitable device was required to be employed. This also contributed to a bulkier piece of equipment as well as requiring considerable skill and experience in producing the syringe devices in the first instance. Consequently, for more or less commercially practical reasons, the syringe-like devices restricted to some extent speedier operation of the automatic diluting apparatus and did not permit the additional advantages engendered by the herein invention to be realized.

Accordingly, it is a major object of the invention to provide automatic diluting apparatus of the character described which achieves all of the advantages of the apparatus of said co-pending application and further, provides an improved automatic diluting apparatus characterized by structural features which enable additional important advantages to be achieved.

A primary object of the invention is to provide apparatus of the character described having novel means for introducing such a volumetric variable into the apparatus for successful operation thereof in accordance with the principles of the said co-pending application and the herein application.

Another important object of the invention is to provide such means for introducing a volumetric variable in apparatus of the character described which utilizes single plunger means for selectively varying the value of said volumetric variable introduced thereby.

Another object of the invention is to provide apparatus of the character described in which said means comprises an elongate, flexible metal plunger or rod having one end portion thereof selectively and slidably movable in the fluid system of said apparatus for introducing said volumetric variable, novel bearing means for supporting said plunger or rod for such sliding movement thereof in the apparatus axially centered with said bearing means and novel actuator means secured to the opposite end portion of said plunger or rod for sliding the same, said actuator means including means for selectively controlling and varying the value of said volumetric variable introduced into the apparatus by said first end portion during movement of the rod.

It is another object of the invention to provide apparatus of the character described in which said actuator means comprises an elongate sleeve having said plunger rod secured therein in a manner to support and position said rod in relation to said bearing means so as to assure centering of the axis of said plunger and said bearing means, one relative to the other during said sliding movement thereof.

It is another object of this invention to provide apparatus of the character described in which said elongate sleeve includes novel registration means associated with multiple calibration means for controlling the sliding movement of said elongate metal rod or plunger into and out of said fluid system and which is adjustably controlled so as to enable introduction selectively of any one of a plurality of volumetric variables into said fluid system with said single plunger.

Another object of the invention is to provide automatic diluting apparatus of the character described having a single fine rod plunger for selectively introducing a volumetric variable into the fluid system to prepare a first solution having a first concentration and without shut down of the apparatus, the same plunger rod may be employed to introduce a second volumetric variable to prepare a further dilution of said first solution or a second solution of either the same or a different concentration without delay occasioned by the preparation or adjustment of the apparatus.

It is another object of this invention to provide apparatus of the character described in which said elongate, flexible metal plunger or rod for introducing said volumetric variable into said fluid system may be readily and easily interchanged with a rod having a different diameter whereby the operating range of said diluting apparatus is controllable to have introduced therein a wide range of volumetric variables thereby providing a wide operating range for the preparation of diluted solutions.

Another object of the invention is to provide apparatus of the character described which can be operated apart from the automatic diluting apparatus as an adjustable volume apparatus for metering relatively small quantities of fluid having a desired concentration.

Another object of the invention is to provide apparatus of the character described which is operative without loss of efficiency, accuracy and speed over a wide range of different concentrations of sample solutions capable of being prepared with said apparatus.

The foregoing and other objects of the invention will become apparent as the description thereof evolves in connection with which a preferred embodiment of the invention is described in detail and illustrated in the accompanying drawings. It is contemplated that minor variations in the size, arrangement, proportion and construction of the parts thereof may occur to the skilled artisan without departing from the scope or sacrificing any of the advantages of the invention.

In the drawings:

FIG. 4 is an enlarged, fragmentary sectional view taken through the apparatus in the vicinity of the sealing bearing to show structural details thereof.

Figure 1:
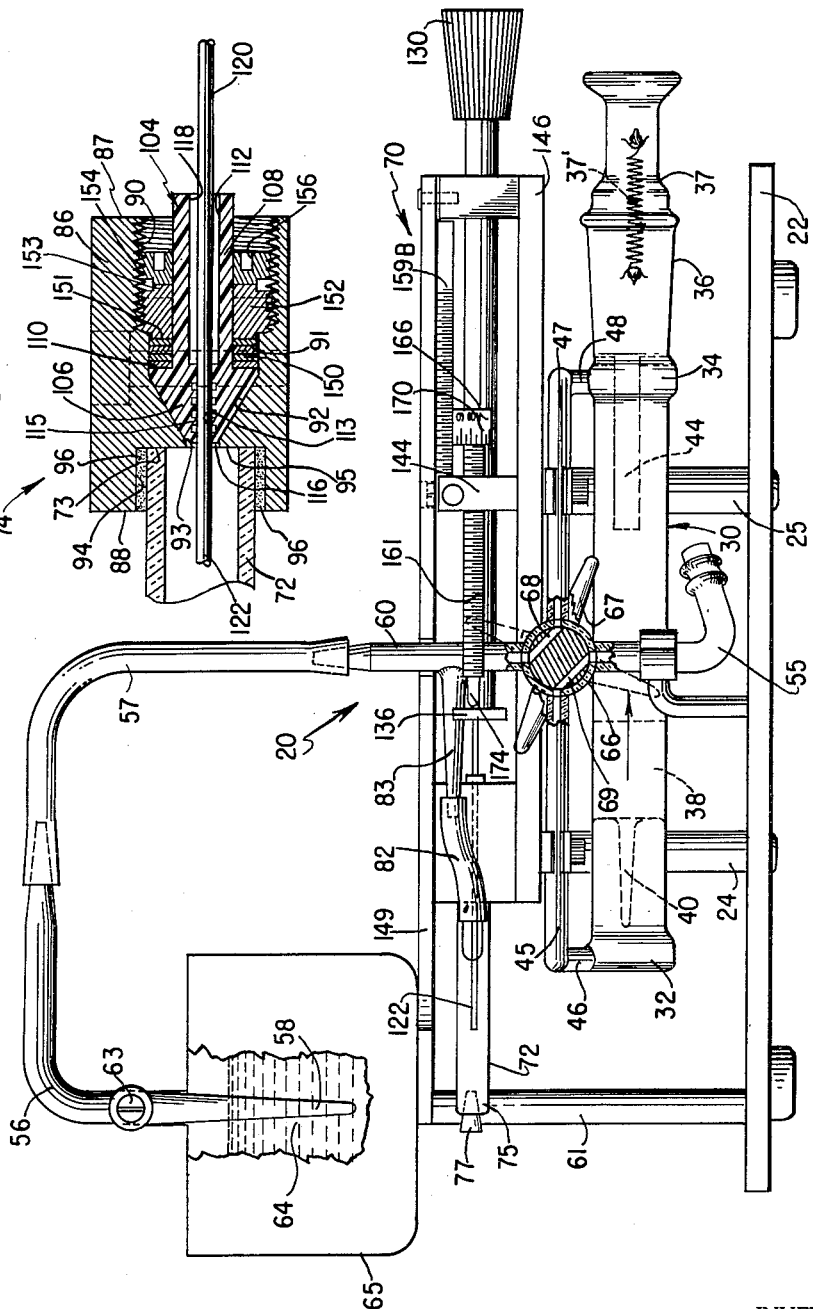
FIG. 1 is a front elevational view of the apparatus constructed in accordance with this invention with portions broken away to show constructional details thereof.

Referring now to the drawings, in FIG. 1, the apparatus embodying the invention is designated generally by the reference character 20. Apparatus 20 conveniently is supported in operating position on a rack comprising a horizontally arranged base 22 having a pair of parallel, spaced apart tubular uprights or standards 24 and 25 of right angle configuration providing the horizontally extending arms 26 and 27 respectively spaced above the base 22 to support operating components of the apparatus. Affixed inside the free end of each tubular arm 26 and 27 is a spring clip 28. It should be appreciated that the precise construction of the base and various supporting elements and the material from which it is made may vary within wide limits without departing from the invention.

The metering valve arrangement of the apparatus 20 includes a horizontally arranged vessel 30 of predetermined volume supported by the standards 24 and 25. Preferably, the vessel 30 may be an accurately formed glass cylinder formed with suitable end fittings for connection into the fluid system. The vessel is closed at both ends thereof, said ends being enlarged respectively as shown at 32 and 34. The enlarged end 34 has an axial extension 36 thereof which is adapted to receive a tapered ground glass stopper 37. The stopper is held in place by means of the springs 37' secured at the opposite ends thereof to protruding lugs provided on the stopper 37 and extension 36. On the interior of the cylindrical vessel 30 is a double acting piston plug 38 of any suitable material, such as glass, plastic or the like, suitably dimensioned to be freely slidable on the interior of the vessel, yet close-fitted therein so as to be separated from the interior wall of the vessel by perhaps a very thin film of fluid which will function also as a lubricant to facilitate sliding movement of the piston 38. The sliding relationship is fluid tight. Suitable gaskets may be used to assure this. Movement of the piston plug 38 in either direction is limited by the stop member 40 on the piston plug and the extension 44 on the glass stopper 37 extending into said vessel 30. It will be apparent that the volume of fluid swept out of the vessel 30 by the piston plug in its sliding movement between the stop means 40 and 44 will be equal to the volume of the vessel 30 between said stop means less the volume displaced by the plug 38. This comprises the predetermined or calibrated volume of said vessel and the volume of fluid which will be dispensed by the apparatus during a single traversal of said plug 38 from end to end of the vessel. To vary said calibrated volume, a differently dimensioned plug 38 or stop means 40 and 44 can be utilized.

A conduit 45, preferably in the form of an integral glass tube, is connected at one end 46 thereof to the enlarged formation 32 in communication with one end of the cylindrical vessel 30. A second conduit or glass tube 47 likewise is sealed at one end 48 thereof to the enlarged formation 34 in communication with the opposite end of the vessel 30. Preferably, each of said glass tubes 45 and 47 is secured to the top of the respective enlarged end formation of the cylindrical vessel to limit formation of air bubbles. The inner end of each of said tubes 45 and 57 is connected to a multiple conduit control valve designated generally 54 with said opposite ends being diametrically spaced apart on the circumference of the valve. Also secured to the control valve 54 is one end of a conduit or glass tube 55 which is to be connected to a source (not shown) of diluent under pressure to be dispensed by the vessel 30. A dispensing conduit 56 provided with a discharge nozzle or outlet 58 is connected to a short section 57 of flexible tubing, which in turn is connected to the glass conduit 60 that is sealed to the valve body. A tubular standard 61 of inverted L-shaped configuration is mounted in an upright position on base 22 and the discharge nozzle 58 is supported thereon, as for example, by having the nozzle 58 pass through a suitable opening formed in horizontal arm 62 of the standard 61. A set screw 63 or other friction means holds the nozzle in place. The nozzle 58 is shown dipping into a container 65 which carries a solution of some kind. It will be appreciated that the nozzle 58 is so spaced above the base 22 that containers are readily brought under the nozzle during use.

The control valve 54 includes a cylindrical body or barrel 66 having the conduits or tubes 45, 47, 55 and 60 connected therewith respectively, at points circumferentially spaced apart approximately 90°. The tape 67 of the control valve has a pair of passageways 68 and 69 therethrough for selectively connecting either of the ends of the cylindrical vessel 30 to the dispensing tube 56.

Simultaneously, the delivery tube 55 is connected to the opposite end of vessel 30.

As seen in FIG. 1, the illustrated solid line position of the tap 67 places the conduit 47 in communication with the conduit 60 which is connected to the dispensing tube 56 through the passageway 68, while placing the conduit 45 in communication with the delivery conduit 55 through the passageway 69. Upon rotating the tap through 90° to the position shown in broken outline, the connection is reversed, that is to say, the ends of the cylindrical vessel 30 which are connected with the source of diluent and the discharge nozzle or out 58 respectively are reversed from the condition illustrated in solid outline in FIG. 1. It will be appreciated that the tap may be rotated 90° either clockwise or counterclockwise to effect such reversal of connections. Considering the condition of apparatus 20 as illustrated in FIG. 1 wherein the plug 38 is at the left-hand end of the vessel 30, diluent under pressure entering the tube 55 will be led through passageway 69 into tube 45 and then, into the enlarged end of formation 32 to impinge against the plug 38 and force said plug to move to the right in the direction of the arrow. In travelling toward the opposite end of the vessel 30, the plug 38 will sweep out of the vessel 30 an amount of fluid corresponding to the calibrated or fixed volume of the vessel 30. The diluent fluid will be fed through the tube 47 and passageway 68 into the tube 60 so that this calibrated volume of fluid will be discharged from the dispensing outlet 58. Concurrently, diluent fluid will fill the vessel 30 to the left of the plug 38. Then, upon again rotating the tap 67 clockwise, for instance, through 90° to the broken outline position thereof illustrated in FIG. 1, the condition of the apparatus 20 will obtain where fluid entering tube 55 will be led through passageway 68 into tube 47 and the enlarged end 34 to impinge against the plug 38 seated against the stop means 44 at the right-hand end of the vessel 30 and drive said plug 38 in the opposite direction or to the left. Fluid in the vessel again will be swept out by the moving plug 38 through conduit 45 into the passageway 69 communicating with the tube 60 and thence, outward through the flexible tube 57 leading to the dispensing tube 56 and the discharge outlet or nozzle 58. Concurrently, the vessel 30 will be filled to the right of said plug. It is intended that the system represented by the various conduits and the vessel 30 be filled with fluid at all times and connection of vessel 30 to the source of diluent under pressure is uninterrupted at all times.

Figure 2:
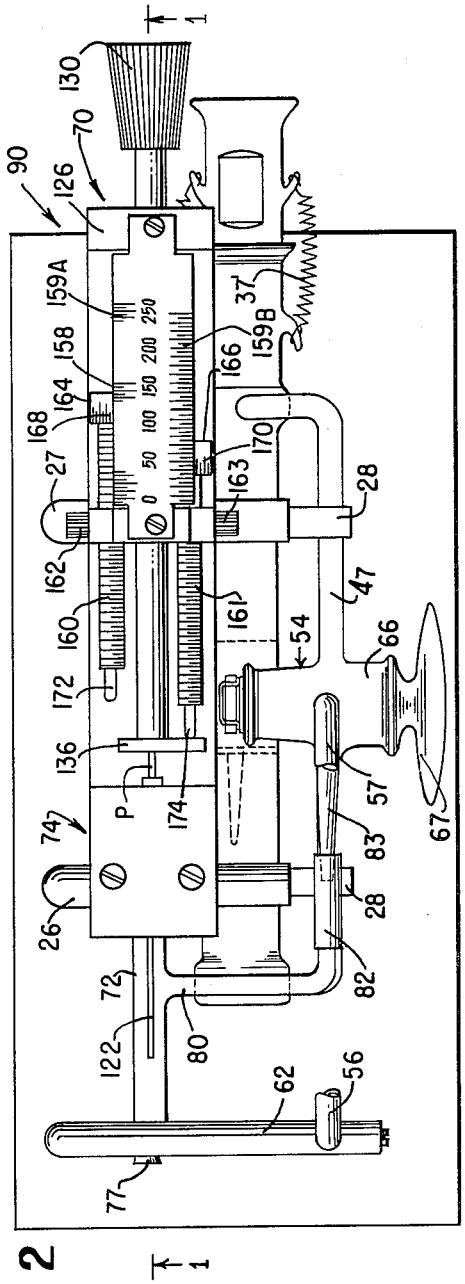
FIG. 2 is a top plan view of said apparatus.
Figure 3:
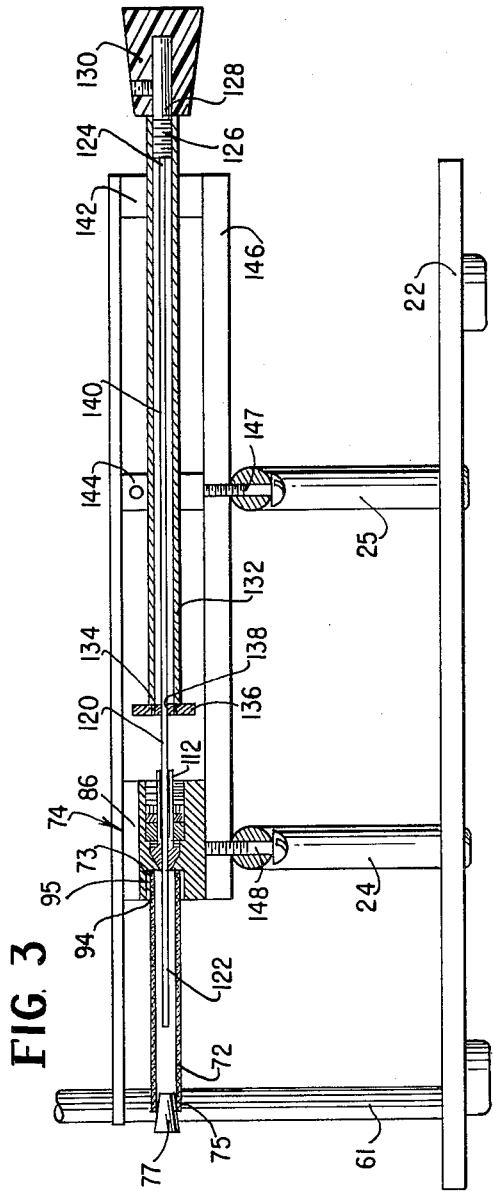
FIG. 3 is a sectional view taken through the apparatus along the line 1—1 of FIG. 2 and in the general direction indicated.

Referring to FIGS. 2 and 3, said means for introducing a volumetric variable into the fluid system is designated generally by the reference character 70. Said means 70 includes a vessel 72 preferably a short, straight length of glass tubing open at opposite ends thereof. One open end 73 is sealed in slide bearing means 74 for purposes to be described subsequently herein. The opposite open end 75 is sealed by a stopper or plug 77 which is removable. Connecting with said vessel 72 intermediate the ends thereof is a right angle conduit 80 which is connected by a flexible tube 82 to a glass tube 83 which is integral with the conduit 60 from the valve 54. Thus, the vessel 72 may be considered to be an offset conduit portion of the discharge end of the fluid system located between valve 54 and the discharge nozzle 58, the vessel 72 being horizontally oriented.

Referring to FIG. 4, slide bearing means 74 is comprised of a rectangular metal block 86 having a central annular bore of irregular contour opening at opposite ends thereof to the opposite vertical end faces 87 and 88 respectively of the block. Said bore has a threaded portion 90 opening to face 87 and extending inwardly from said end face a substantial distance. At its inner end, portion 90 connects with a bore portion 91 which is unthreaded and of reduced diameter and which joins with a frusto-conical tapered portion 92. The smaller end 93 of tapered portion 92 faces toward the opposite end face 88 of said block 86 and opens into the enlarged cylindrical bore portion 94 that opens to opposite end face 88. The inner end of bore portion 94 forms a shoulder 95 at the juncture of tapered end 93 therewith. It will be noted that the several bore portions 90, 91, 92 and 94 are coaxial with the axis arranged horizontally.

The open end 73 of vessel 72 is secured in annular bore portion 94 engaged against shoulder 95 with the longitudinal axis thereof aligned with the axis of central bore through the block. A suitable cement 96 can be used to hold the vessel in place in the block 86 so that said end 73 is sealed in communication with one end of the central bore in the block.

Removably secured in the central bore of the block 86 is a bearing member designated generally 104 and preferably made of tetrafluoroethylene or other suitable material for the purposes to be described. Said member 104 has a frusto-conical head 106 at one end thereof shaped to conform to the configuration of tapered bore portion 92. Integral with said head 106 is a hollow, cylindrical tube portion 108 having an outside diameter smaller than the diameter of bore portion 90, the juncture of the tube 108 and head 106 providing a shoulder 110. The tube 108 has a central annular passageway 112 which at its inner end communicates with a passageway 113 through the head 106, said passageways 112 and 113 being coaxial and of different diameters with the passageway 112 being larger. A series of annular grooves form concentric rings 115 along the passageway 113 on the interior thereof. The passageway 113 opens to the tapered end of the head 106.

The bearing member 104 is located in the block 86 with its head 106 tightly engaged in the bore portion 92 and the tapered extremity 116 approximately flush with shoulder 95, although this is not critical. Of importance is the fact that the tapered extremity 116 seals the tapered end 93 of bore portion 92 except for the passageway 113. As seen in FIG. 4, the shoulder 110 reaches to the bore portion 91 and the passageway 112 is formed in tube 108 and opens at end 118. The axes of the central bore of the block and the passageways 112 and 114 are coincident, that is, the bearing member is matingly engaged in the block 86 coaxially with the central bore through the block.

Mounted for sliding movement in the bearing member 104 is a plunger 120 comprised of an elongated metal rod of conforming circular cross-section to enable close and fluid-tight fitting thereof in the passageway 113. The plunger 120 has an end portion 122 extending through open end 73 into the vessel 72. The opposite end 124 of the plunger is rigidly secured to the threaded end 126 of a pin 128 on which is secured a knob 130. Secured to said threaded end 126 is one end of an elongate, cylindrical sleeve 132 with the plunger 120 extending axially and outwardly through the opposite end 134 of said sleeve. Secured to the face of said end 134 is a stop plate 136 the diameter of which is greater than the diameter of said sleeve. Said plate 136 has a central bearing opening 138 in which the plunger 120 is slidably engaged. As seen in FIG. 3, the portion 140 of the plunger in sleeve 132 is a major fractional portion of the entire length of the plunger and that end 124 of said plunger is secured to the actuator knob 130 a substantial distance from the bearing support thereof provided by bearing opening 138 and passageway 113.

Referring to FIG. 3, sleeve 132 is slidably mounted in bearing blocks 142 and 144 supported on a bed plate 146. The bed plate 146 is removably mounted on the standards 24 and 25 by means of the bolts 147 and 148. Likewise, the slide bearing means 74 are secured on the bed plate 146 by means of bolt 148 engaged through the bed plate into block 86. The bed plate 146 is horizontally arranged parallel to and spaced above the base 22. The sleeve 132, plunger 120, slide bearing means 74 and vessel 72 are coaxially aligned one relative to the other so that the end portion 122 of the plunger can be moved to the left and right inside vessel 72. A removably mounted transparent cover 149 may be provided to protect means 70.

The packing for the movable plunger 120 is quite critical because it is necessary to provide absolute fluid tight connection while permitting ready reciprocation of the plunger. As explained the primary elements are the headed bearing member 104 and the pressure packing parts 150 and 152. As the bushing 152 is screwed down, it forces the washers against the head of member 104. The head in turn is driven into the conical taper 92, thereby applying a wedging force thereon tending to force the bore 113 to constrict about plunger 120. The grooves and their resulting rings 115 are in effect a crushable area that intimately engages the plunger 120 in its movement. The result is a sort of squeegee action that retains fluid tightness without seriously resisting movement of the plunger. The tetrafluoroethylene also aids in this, since it is a "slippery" plastic. Nylon and perhaps other substances will be effective also.

Means are provided enabling the end portion 122 to be moved axially inside the vessel 72, a predetermined identical distance, and adjustment means are provided for selectively varying said predetermined distance. A calibrated volumetric scale 158 having indicia markings 159A and 159B along opposite edges thereof, is secured across the tops of the bearing blocks 142 and 144. The scale 158 is calibrated in terms of the volume of the space occupied by the end portion 122 in its innermost position within the vessel 72. Consequently the withdrawal of fractional portions of said end portion 122 from inside said vessel 72 will introduce a corresponding volumetric variable into the system. A pair of elongated externally threaded adjustable stop members 160 and 161 are received in suitable openings in the bearing block 144 in parallel relation to said sleeve 132, for limiting the withdrawal movement of said sleeve. A pair of set screws 162 and 163 is provided for respectively locking said stop members in a given selected position in said block 144. Each of said stop members 160 and 161 has an enlarged end 164 and 166 respectively affixed thereon which are provided with vernier scales 168 and 170 respectively, the vernier scales being in registration with the scales 159A and 159B respectively. The opposite end of each stop member 160 and 162 has a short extension 172, and 174 projecting respectively therefrom in the direction of the bearing means 74.

Adjustment of the stop members 160 and 161 is accomplished by bringing the vernier scales 168 and 170 into registration with the desired calibration on scale 159A or 159B. When the plate 136 is flush against the face 87 of the bearing means 74 the apparatus is in the zero position or the start position, that is to say, the end portion 122 is in its innermost position. It will be appreciated that by rotating the knob 130 the entire sleeve 132 rotates thereby moving the plate 136 from one side of the base 146 to the other side thereof so that the plate is in line with one of the extensions 172 or 174. Withdrawal of the sleeve 120 by pulling out on the knob 130 causes the plate 136 to move from the start position until it meets one of the extensions 172 or 174. The action of the end portion 122 being withdrawn from inside the filled vessel 72 causes fluid to fill the space that had been created. This has the net effect of causing an equivalent volume of fluid to be drawn up into the nozzle 58.

Considering now the operation of apparatus 20, for purposes of description, it will be presumed that it is desired to prepare a predetermined diluted blood solution for a blood count determination. This will require one part blood in 500 parts of solution. The known volume of the vessel 30 will be selected at 20 milliliters. The volumetric capacity of the capillary tubing of the dispensing tube 56 is of the order of 250 microliters to correspond to the calibrated scale 158. The apparatus is initially filled completely with diluent by the manipulation of the control valve 54, and it will be assumed that the tap 67 is in the dotted line position of FIG. 1.

Based on a final volume of 20 milliliters, as determined by the volume delivered by the cylinder 30, the stroke of the plunger P should be set to withdraw 40 microliters of concentrate 64 from a beaker 65. Stop member 161 is adjusted, after loosening the set screw 163, until the zero on the vernier 166 lines up with the marking "40" on the scale 159B. Set screw 163 is tightened to fix the position of the stop member 161. The plunger P is moved to the start position by pushing in on the knob 130 so that the plate 136 is flush up against the face 87 of the bearing means 74, and the knob turned so as to position the plate 136 in the path of the extension 174.

The nozzle 58 is then inserted into the concentrate 64. The operator pulls the knob 130 and causes the plunger P to be withdrawn until it is stopped by the plate 136 meeting the extension 174. The distance the plate 136 was moved from its initial position to the predetermined position represents that volume of the end portion 122 that was removed from inside the vessel 72. The volume occupied by the portion that was removed, in accordance with the setting of stop member 161, is equivalent to the volume of concentrate 64 drawn up through the nozzle 58 into the dispensing tube 56.

The beaker 65 is removed and the tip carefully wiped. A clean container is now placed well below the nozzle 58 to catch its discharge. The tap 67 is rotated to the solid line position shown in FIG. 1. Diluent will enter tube 55, under pressure, and into the conduit 45, through passageway 69, and into the vessel 30 at the left of the plug 38. Diluent impinging on the face of the plug urges it to the right, in the direction of the arrow toward the opposite end of the vessel 30. When the plug has traversed the vessel 30 until stopped by the arm 44, 20 mls. of diluent will have been dispensed into the conduit 60 through the passage 68 communicating with the tube 47 that leads to the enlarged end 34 of the vessel 30. As the plug 38 moves through the vessel 30 it forces out the fluid in its path. The diluted sample discharges from the nozzle 58 being received in the clean container as the vessel 30 delivers its measured volume to prepare a diluted solution of 1 part blood to 500 of diluent.

A second separate dilution can be made to prepare a dilution of 1 part in 200 with the other stop member 160 set at 100 microliters. As still another option the operator may prepare a serial dilution of the first dilution of 1 part in 500, to one that is 1 part in 100,000.

Assuming that it is desired to prepare a serial dilution of the first dilution the operator will wipe from the nozzle 58 any excess fluid and place the breaker containing the 1 part in 500 dilution in communication with the tip 58 and withdraw the plunger P by pulling out on the knob 130. As the plunger P is withdrawn from the closed fluid system in the apparatus, the end portion 122 is withdrawn from inside the vessel 72. A volume of 100 microliters will be withdrawn into the dispensing tube 56 as a result of the volumetric variable introduced into the system by the plunger action. The beaker is removed and the tip wiped. A clean container is now disposed below the nozzle. The control valve 54 is operated by rotating the tap 67 to the dotted line position of FIG. 1 admitting diluent into the tube 47 under pressure from the inlet 55 through the passageway 68. The plug 38 traverses the cylinder 30 being moved by the force of the diluent toward the enlarged end 32. A metered volume of diluent is forced into the conduit 60 via passageway 29. The diluent passes into the dispensing tube 56 and discharges from the apparatus through the nozzle 58 automatically diluting the 100 microliters received into the dispensing tube 56. The final volume delivered into a clean receptacle is equivalent to the volume capacity of the vessel 30 and the once-diluted sample and this volume includes the volumetric variable that was introduced into the system.

The dilution thus prepared has a concentration of $$\frac{1}{N_1} \times N_2$$

where $$\frac{1}{N_2}$$

is the dilution which would have been realized had a second dilution been prepared independently of the solution $$\frac{1}{N_1}$$

An alternate procedure may be followed in cocking the plunger P in readiness for a second run which eliminates waiting until the plug 38 completes its traversal of the vessel 30. Tracing back in the procedure to where the valve 67 is just rotated to the solid line position in FIG. 1, and the diluent begins to flow from the system, automatically diluting the concentrate taken up in the dispensing tube 56, the operator may loosen the set screw 162 and adjust the stop member 160 to the 100 microliter setting locking the position with said set screw. Without waiting for the vessel 30 to deliver the metered volume the operator may turn the knob 130 to align the plate 136 with extension 172 and at the same time push in on said knob to insert the end portion 122 back into the vessel 72. This will cause an added volume of diluent to be discharged from the nozzle 58 increasing the volume of the final concentration over and above the fixed volume of the vessel 30. The error that this procedure contributes to the final concentration is very slight and may be tolerated in the interest of cocking the apparatus ready for the next run thereby achieving the advantage of decreasing the time it takes to make a dilution.

In the circumstance that it is desired to dispense small volumes of concentrate accurately, in order to prepare solutions in the microliter volume range, the withdrawal means 70 can be used independently of the vessel 30. With apparatus filled with diluent the plunger 120 is cocked so that the end portion 122 is in its innermost position within the vessel 72, and the plate 136 in line with extension 174 of the stop member 161, which has been set to deliver 40 microliters. With the nozzle 58 inserted into the concentrate 64 the operator pulls out on the knob 130 until the plate 136 meets the extension 174. Forty microliters of concentrate are drawn up into the dispensing tube 56. Any excess fluid is wiped from the nozzle 58. The microvolume may be immediately discharged into a clean beaker by pushing in on the knob 130 forcing the end portion 122 into the vessel 72. Turning the knob 130 to bring the plate 136 in line with extension 172 the apparatus is now cocked for measuring out 140 microliters. After wiping the excess fluid from the nozzle, the operator by manipulating the plunger P can draw up a second volume of concentrate to be added to the previous volume or may be received into still a separate beaker.

From the foregoing description it will be apparent that the withdrawal means can be variously operated with a singular vessel having a rod slidably inserted therein to create the pressure differences therein for either taking up or dispensing the concentrates. Also, the calibration means provided for setting the stroke of the rod to deliver a specific volume is easily and rapidly adjusted providing multiple scale settings that can function from the one plunger P and the one vessel 72.

It is believed that the invention has been described in sufficient detail so as to enable the skilled artisan to understand and practice the invention in all of its ramifications. It will be appreciated that variations in the structure of component parts of the withdrawal means for accomplishing the functions thereof may be possible for effecting an automatic dilution apparatus, such as in the type of materials used to form the sealing arrangement of the sealing bearing, the disposition or construction of rod and calibration means or other parts of the apparatus but still using the basic principles of operation thereof. The invention has been distinctly pointed out in the claims hereto appended using language intended to be broadly construed commensurate with the progress in the arts and sciences contributed by the invention.

What it is desired to secure by Letters Patent in the United States is:

1. Automatic diluting apparatus comprising, a closed vessel having an inlet port and an outlet port and a piston freely movable between said ports in opposite directions for sweeping out a known volume of fluid from the vessel through either one of said ports depending upon the direction of movement of the piston, a fluid control valve having individual fluid conduit connections with each of said ports, a fluid dispensing tube adapted to be connected to a source of diluent under pressure, said valve being selectively operable to connect either one of said conduit connections to either one of said dispensing and delivery tubes with the other of said conduit connections connected concurrently to the other of said dispensing and delivery tubes, and means for selectively introducing a volumetric variable into said apparatus, said means comprising a second vessel filled with fluid connected to said fluid dispensing tube, a plunger movable axially in said second vessel and having an end portion therein, said plunger being movable from a start position a predetermined distance, bearing means for slidably receiving said plunger therein and actuator means to control the movement of said plunger from said start position, said predetermined distance, whereupon a portion of said end portion is withdrawn from inside said second vessel to introduce a volumetric variable into said apparatus equal to the volume of said end portion withdrawn, said valve operable thereafter automatically to cause discharge of said known volume of diluted solution through said discharge outlet.

2. The apparatus described in claim 1 wherein said second vessel is sealed onto said bearing means in communicative relation therewith permitting the axial movement of said end portion of said plunger inside said second vessel while said second vessel remains fluid-tight.

3. The apparatus described in claim 1 wherein said bearing means includes a bearing member axially engaging said plunger, providing a sliding surface therefore within said bearing means.

4. The apparatus as described in claim 3 wherein said bearing member is comprised of tetrafluorethylene plastic material.

5. The apparatus as described in claim 1 wherein said bearing means includes packing means to render said bearing member fluid-tight within said bearing means so as to provide a seal between said bearing means and said second vessel.

6. The apparatus described in claim 1 wherein said actuator means comprises a sleeve member enclosing the other end of said plunger therein in a manner whereby the reciprocal movement of said plunger is oriented axially into said bearing means.

7. The apparatus described in claim 6 wherein said actuator means has calibration means for selectively limiting the withdrawal movement of said plunger from said start position a predetermined distance, whereby said distance represents the volume of volumetric material to be introduced into said apparatus.

8. The apparatus described in claim 7 wherein said calibration means comprises adjustable stop means associated therewith, said stop means being in registrable alignment with said calibration means and adapted to limit the withdrawal movement of said plunger.

9. An automatic diluting apparatus having a first vessel and means for displacing a predeterminable volume of diluent from said first vessel and a conduit system connected with said vessel for discharging a corresponding volume of diluent from the apparatus when said diluent is displaced from the vessel, adjustable volume means operably connected with said conduit system for introducing into a system a predetermined quantity of concentrate calculated automatically to provide said same predeterminable volume of diluent subsequently discharged from the apparatus having a predetermined concentration of concentrate therein, said means comprising a second vessel filled with fluid, a plunger rod having one end portion thereof inside said second vessel, said plunger being adapted for reciprocal movement within said vessel between a start position and a withdrawn position, bearing means adapted to slidably receive said plunger between its ends, and actuating means for controlling the axial movement of said plunger into said bearing means whereby movement of said plunger to said withdrawn position introduces into the system a predetermined quantity of concentrate.

10. An automatic diluting apparatus having a first vessel and means for displacing a predeterminable volume of diluent from said first vessel and a conduit system connected with said vessel for discharging a corresponding volume of diluent from the apparatus when said diluent is displaced from the vessel, adjustable volume means operably connected with said conduit system for introducing into a system a predetermined quantity of concentrate calculated automatically to provide said same predeterminable volume of diluent subsequently discharged from the apparatus having a predetermined concentration of concentrate therein, said means comprising a second vessel filled with fluid, a plunger rod having one end portion thereof inside said second vessel, said plunger being adapted for reciprocal movement within said second vessel between a start position and a withdrawn position, bearing means adapted to slidably receive said plunger between its ends, said second vessel being in fluid-tight communication with said bearing means, and actuating means associated with the other end of said plunger for controlling the reciprocal movement of said plunger relative to said bearing means in an axially oriented relationship thereto, whereby movement of said plunger to said withdrawn position introduces into the system a predetermined quantity of concentrate.

11. The apparatus described in claim 10 wherein said actuating means comprises a rotatable sleeve member adapted to enclose the other end of said plunger and calibration means associated with said sleeve member for selectively limiting the extent of the outward movement of said end portion inside said second vessel.

References Cited in the file of this patent

UNITED STATES PATENTS

| | | |
|---|---|---|
| 939,382 | Beard | Nov. 9, 1909 |
| 2,677,480 | Wiczen | May 4, 1954 |
| 2,885,119 | Carriol | May 5, 1959 |
| 3,043,303 | Still | July 10, 1962 |